United States Patent

Wong et al.

[11] Patent Number: 5,956,699
[45] Date of Patent: Sep. 21, 1999

[54] SYSTEM FOR SECURED CREDIT CARD TRANSACTIONS ON THE INTERNET

[75] Inventors: Jacob Y. Wong, Goleta; Roy L. Anderson, Glendale, both of Calif.

[73] Assignee: Jaesent Inc., Goleta, Calif.

[21] Appl. No.: 08/971,272

[22] Filed: Nov. 17, 1997

Related U.S. Application Data

[63] Continuation-in-part of application No. 08/720,785, Oct. 3, 1996.

[51] Int. Cl.$^6$ ...................................................... G06F 17/60

[52] U.S. Cl. .......................... 705/39; 235/380; 340/825.33; 380/23; 380/24; 380/42; 380/43; 705/26; 705/44

[58] Field of Search .................................. 705/35, 26, 27, 705/38, 39, 40, 41, 42, 43, 44; 340/825.3, 825.31, 825.33, 825.34; 235/375, 380, 379, 382, 382.5; 380/23, 24, 25, 42, 43, 4; 902/2, 4, 5

[56] References Cited

U.S. PATENT DOCUMENTS 5,557,518 9/1996 Rosen ........................................ 380/24
5,671,280 9/1997 Rosen ........................................ 380/24

*Primary Examiner*—Stephen R. Tkacs
*Attorney, Agent, or Firm*—Lyon & Lyon LLP

[57] ABSTRACT

A method for providing secure credit card transactions over the Internet generates a personal charge number from a user account number by inserting a user key into the user account number in accordance with an algorithm that uses a user insertion key and a permutation variable. After the personal charge number is used, the permutation variable is changed, and a new personal charge number is generated. A money source repository verifies the validity of the personal charge number by using the personal charge number and a user identifier to access a file with the user account number, the user key and the user insertion key, taking into account which permutation variable is valid at a given point in time. Alternatively, the money source repository could generate a string of valid personal charge numbers for a user which are sequentially accessed according to usage.

18 Claims, 1 Drawing Sheet

SYSTEM FOR SECURED CREDIT CARD TRANSACTIONS ON THE INTERNET

CROSS-REFERENCE TO RELATED APPLICATIONS

This present application is a continuation-in-part of U.S. application Ser. No. 08/720,785 filed on Oct. 3, 1996 for SYSTEM AND METHOD FOR PSEUDO CASH TRANSACTIONS. The disclosure of that application is specifically incorporated herein by reference.

FIELD OF THE INVENTION

The present invention is in the field of electronic money/Internet payment systems.

BACKGROUND OF THE INVENTION

As the Internet continues to transform commerce as we know it, method of payment is one component that is critical to successfully conducting business across a network. Today shoppers purchasing goods or services on the Internet are required to give their credit card numbers, phone numbers and/or addresses over the Internet in order to complete their transactions. The problem is that they do not know who else might be able to retrieve this information without their knowledge or consent. No doubt people are still very enthusiastic about the idea of Internet commerce. However, they are much more reserved in believing its potential, all because of the issues of privacy and potential credit liability not being fully resolved and protected in shopping on the internet at the present time.

U.S. application Ser. No. 08/720,785 filed on Oct. 3, 1996 for SYSTEM AND METHOD FOR PSEUDO CASH TRANSACTIONS cited and reviewed five electronic payment systems for use on the Internet, viz. First Virtual, Cybercash, Netbill, Millicent and Digicash or ecash. The conclusion was that no satisfactory systems and/or procedures for electronic money/Internet payment existed. However, since personal privacy and credit liability will no doubt continue to be issues of great importance for potential Internet users, commerce on the Internet simply cannot flourish without a cash dispensing system that not only guarantees these features, but also others that take advantage of the simplicity and convenience of buying and selling on the Internet.

In order to fill such an urgent need, a novel system and method for pseudo cash transactions was advanced in U.S. application Ser. No. 08/720,785 Through this system, totally anonymous or effectively anonymous cash-like transactions are accomplished by using a pseudo cash data packet converter for inserting a user key into a pseudo cash preliminary data packet through the use of a user insertion key to generate a pseudo cash unit with a fixed monetary value that can be used to purchase goods or services via the Internet. A pseudo cash repository facilitates the cash the cash-like transactions and maintains a record of the pseudo cash units and their fixed monetary value. Depending upon the level of anonymity selected by a purchaser, the pseudo cash repository can either transmit pseudo cash preliminary data packets or pseudo cash units to a first entity. If the first entity loses an effectively anonymous pseudo cash preliminary data packet, it can be replaced by the pseudo cash repository.

Since the filing date of the aforementioned U.S. application Ser. No., 08/720,785, viz. Oct. 3, 1996, additional electronic payment systems for the Internet have been advanced (see for example, *Electronic Payment Systems*, by Donald O'Mahoney et al., ISBN: 0-89006-925-5, and published by ARTECH HOUSE PUBLISHERS, 1997). Not necessary in chronological order or in completeness, some of these important systems are listed and reviewed as follows.

Magic Money is a system proposed for the implementation of fully anonymous digital cash using blind signatures. It has many similarities with the Digicash or Ecash system cited earlier in the application Ser. No. 08/720,785, and was designed for experimental purposes by a group of cryptographic enthusiasts, know as cypherpunks, on the Internet. The source code is available in computer software language C and there is an example client program that can automatically accept and pay out Magic Money currency. This system is set up purposely to be rather complex and the users are required to have extensive knowledge in computer software before they can use the system efficiently.

Project CAFÉ is an advanced electronic payment system developed as the result of a project funded by the European Community and started in 1992. CAFÉ is a hybrid scheme in the sense that it offers all the benefits of anonymous electronic cash but at the same time lets the user sign checks up to a specified amount. It is an advanced payment mechanism that makes use of secure tamper-resistant devices such as smart cards and strong cryptographic protocols. It also provides untraceable electronic payments and guarantees the security of all parties concerned. However, this advanced electronic payment system is necessarily a very complex system involving the cooperation and participation of many willing players and hence not especially efficient and simple for use in the Internet by the general public.

NetCash is an identified online electronic cash system, for open networks. It consists of distributed currency users that mint electronic coins and issue them to the users of the system, accepting electronic checks in payment for them. The system is online in that each coin must be verified as being valid and unspent by forwarding it to the minting currency server for verification during a purchase. Although the digital cash is identified, with each coin having a unique serial number, there is an exchange mechanism to provide limited anonymity. Anyone with valid coins can exchange them anonymously with a currency server for new ones.

NetCash is a macropayment system suitable for selling hard goods, information, or other network services. Users can both make and accept payments. It is a software-only solution, requiring no special hardware. Both asymmetric and symmetric cryptography is used to provide the network security of the system and to limit fraud. Unfortunately, like the previously cited electronic cash payment systems, it encompasses too many facets of application and is certainly more complex than is needed for doing simple commerce electronic transactions on the Internet.

Both Mondex and EMV Cash Card are electronic cash card or prepayment card systems to effect payment in the retail context. Their scheme involves preloading a chip card with value that could then be spent at retail outlets. As such, this electronic cash systems, without a major structural redesign, is not suitable for use with the Internet.

Besides electronic cash payment systems alluded to above, there are also credit card-based systems such as MOTO (Mail order/telephone order transactions). Unsecured network payments, First Virtual (cited earlier in application Ser. No. 08/720,785), CARI (Collect all relevant information), SSL (secure socket layer) and SET (Secure Electronic Transactions). All of these credit card-based payment systems use sophisticated software packages, secure tamper-resistant hardware devices and strong cryptographic protocols involving the users, the merchants and the issuing money sources.

There are two fundamental characteristics that are common to all electronic card payment and credit card-based payment systems today. First, security and privacy of vital personal information that is transmitted over the Internet are always entrusted by the user to the money source such as the bank, credit card company etc. In other words, the user gives out the vital personal information directly on the Internet and relies solely on embedded software at his or her computer (supplied in many cases by the money source) or the server of the money source for encryption of such information before it appears publicly on the Internet. Thus it depends on how secured the individual user feels before he or she is willing to give out their vital personal information, irrespective of what electronic cash or credit card-based systems that he or she uses. Sometimes even an iron-clad guarantee by these electronic cash or credit card-based system sponsors may not be good enough to influence an individual user's decision to conduct or not to conduct commerce on the Internet using either some form of digital cash or credit cards. In fact, as alluded to earlier, until such time that a simple electronic cash system, trusted absolutely 100% by the users on the Internet, becomes available, security of privacy remains as the single most important issue that will stymie the future growth of commerce on the Internet.

Second, transactions on the Internet for practically all electronic cash or credit-card-based systems of today invariably involve a three-way interaction, namely among the user, the merchant and the money source. This characteristic or feature of present day systems not only requires the system structure to be necessarily more complex, it also generally takes more time and is more costly for transactions to take place on the Internet.

The novel system for processing electronic cash transactions anonymously (or code-named SPECTA) on the Internet, as advanced in U.S. application Ser. No. 08/720,785 filed on Oct. 3, 1996, significantly reduces the role of merchants in any Internet commerce transaction to just verifying the validity of the digital cash tendered or the user's credit card (to be discussed below). It also simplifies any transaction on the Internet from a three-party interaction to that of only two. Furthermore, the SPECTA system allows the user to encrypt very simply his or her vital personal information (such as digital cash, name and address, telephone or credit card numbers etc.) himself or herself, before placing such information on the Internet. This feature might appear to be routine and superficial on the surface. However, from the security standpoint, it is extremely important. The reason is that by having the user encrypt just his or her own vital information on the Internet, it eliminates the desire for any pirate to decode such information. Contrary to cracking the encryption code of a money source, which could lead to a wealth of vital information that possesses monetary value, there is simply not enough monetary inventive to crack just one or two individual users' encryption codes on the Internet. Thus the SPECTA system by design offers a much stronger security to safeguard the privacy of personal information for users on the Internet.

It is an object of the present invention to extend the SPECTA electronic cash transaction system, which was filed as U.S. application Ser. No. 08/720,785 on Oct. 3, 1996 for SYSTEM AND METHOD FOR PSEUDO CASH TRANSACTIONS, to include the use of credit cards for conducting commerce on the Internet. This feature is especially important as more and more Internet users gain confidence to do commerce on the Internet and prefer to use the more convenient credit cards to pay for goods and services tendered to them.

SUMMARY OF THE INVENTION

The present invention is generally directed to electronic money/Internet payment systems that insert a user key into a user account number in accordance with a user insertion key through use of an algorithm to generate a personal charge number so customers and vendors can buy and sell merchandise and information on the Internet in a manner resembling real-life credit card transactions.

In a first, separate aspect of the present invention, a permutation variable is used to generate different personal charge numbers from a user account number according to a valid state of the permutation variable. A user transfers the personal charge number and a user identifier, such as a name or social security number, to a vendor. The vendor can then transmit the personal charge number and user identifier, along with a transaction monetary value, to a money source repository for payment. If the personal charge number is validated for the user, the vendor is paid and the user is charged for the transaction. Once a personal charge number is used, the permutation variable is changed, and the personal charge number will no longer be valid.

In another, separate aspect of the present invention, the permutation variable is a permutation state of the user insertion key. The permutation state can be varied by simple clockwise rotation. Using this variation, a personal charge number will cycle through periods of being valid or invalid according to a very simple selection process.

In yet another, separate aspect of the present invention, a list of valid personal charge numbers for a user is generated by a Money Source. As the user uses a valid personal charge number, it is deactivated and the next personal charge number is activated. In this manner, the Money Source can scroll through a list of valid personal charge numbers for a user. If any of the inputs used to create the list are varied, the list can be replaced by a newly generated list.

Accordingly, it is a primary object of the present invention to provide an improved payment system suitable for use on the Internet, which allows buyers and sellers to conduct credit card transactions.

This and further objects and advantages will be apparent to those skilled in the art in connection with the drawings and the detailed description of the preferred embodiments set forth below.

DETAILED DESCRIPTION OF THE PREFERRED EMBODIMENTS

Figure 1:
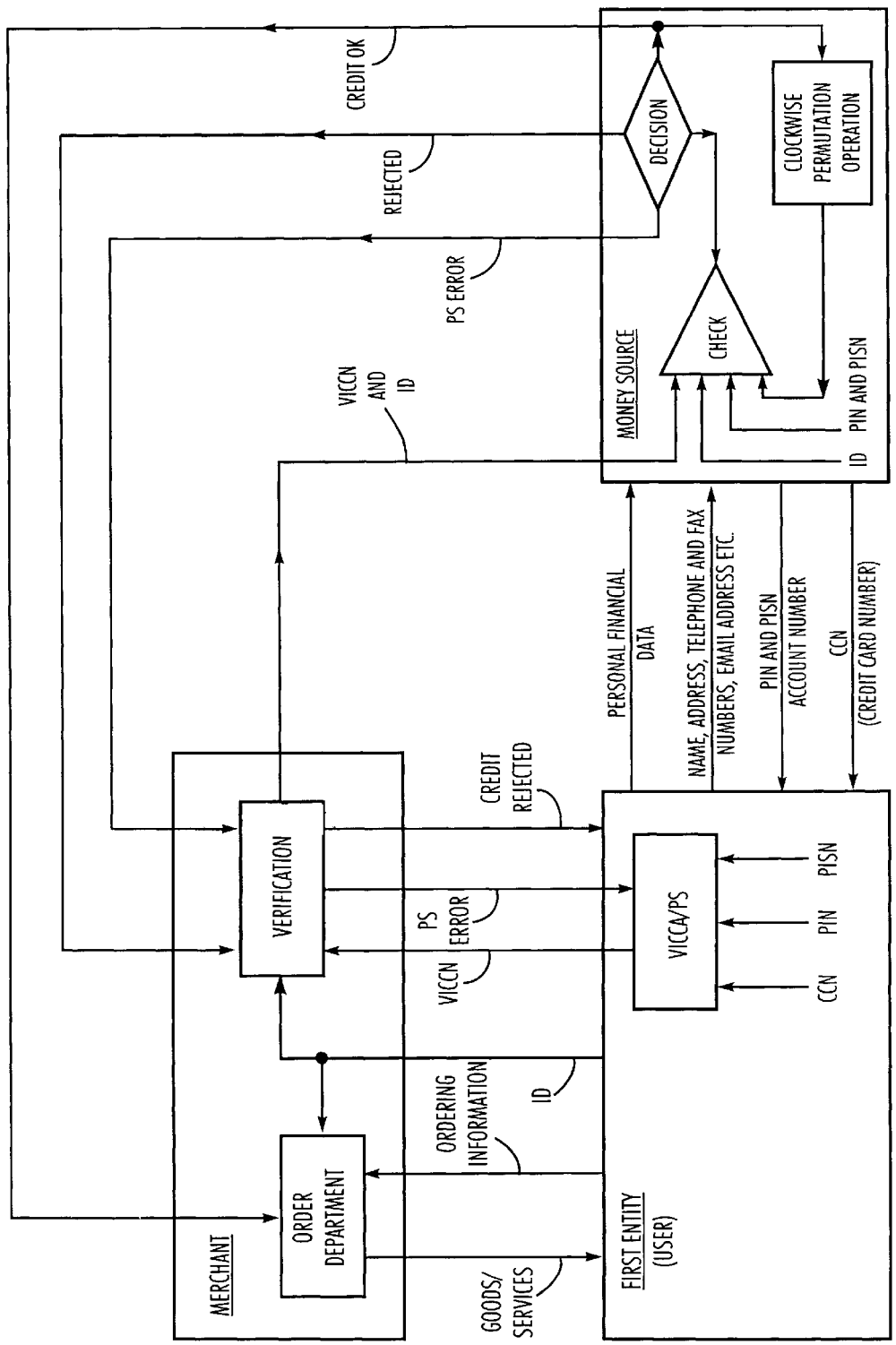
FIG. 1 is a schematic drawing depicting a system and method for conducting commerce on the Internet with a credit card according to the present invention.

The present invention is an extension of the SPECTA system disclosed in U.S. application Ser. No. 08/720,785 filed on Oct. 3, 1996 as referred to earlier. The SPECTA system enables pseudo cash transactions to be conducted on the Internet by relying upon pseudo cash units generated by insertion of user keys into pseudo cash preliminary data packets in accordance with user insertion keys through the use of an algorithm. In a similar way, the present invention enables credit transactions to be conducted on the Internet by relying upon convenient and secured valid Internet credit card numbers (VICCN) generated by insertion of user keys into user account numbers in accordance with user insertion keys through the use of a slightly more complicated algorithm which uses permutation variables.

A preferred embodiment of the present invention, which uses VICCN generated by a Money Source, is depicted in FIG. 1. A first entity (user) must initially establish a business relationship with the Money Source which assigns the first entity a user account number and enters into an agreement with the first entity regarding use of the account number. The user account number can represent an actual account number that the first entity has with the Money Source, such as a credit card number, a savings account number, a checking account number, a money market number, a brokerage account number, etc., or it can simply be an identification number assigned to the first entity by the Money Source. Although the preferred embodiment is hereinafter described in connection with credit card or charge transactions, the invention is equally applicable to other financial transactions involving debits and credits, such as checking transactions or direct withdrawals from an existing account. Once the first entity establishes an account number with the Money Source, the first entity selects (or the Money Source assigns to the first entity) a Personal ID Number or PIN and a PIN Insertion Sequence Number (PISN) and a record associated with the first entity is generated by the Money Source in a money source repository. The record will include the user account number of the first entity, the user key of the first entity, the user insertion key of the first entity and a first entity identifier (ID). The ID can take the form of any number of buyer identification information, such as name, shipping address, email address, phone or fax number, social security number, buyer identification number, etc. It is contemplated that the record will be maintained electronically in a secure data base by the Money Source, and the exact form and parameters of the record, as well as its generation and maintenance, should be well within the skill of one of ordinary skill in the art of computer programming. Further, the term "record" could encompass multiple data files, so long as the referenced information is stored somewhere such that it can be retrieved or linked together as necessary to carry out the requisite functions of the present invention.

The novel methodology advanced in the present invention is to allow the user to encrypt the user's personal charge number (CCN) in a very simple fashion according to the SPECTA system and include the additional important feature of the PISN Permutation State in the generation of a VICCN for use in commerce on the Internet. When the personal charge number is used for the first time on the Internet, the Permutation State (PS) of the PISN, or PSNPS, is simply the original PISN as first assigned to or selected by the first entity. For example, suppose the user's CCN is "123456789123456", the PIN is "7890" and the PISN is "2468". Then the VICCN, when the credit card is used for the first time on the Internet, is (for PISNPS=2468) simply "1(7)2(8)3(9)4(0)56789123456". When the personal charge number is used the second time, the PISNPS must be changed by a simple clockwise rotation permutation in which the new PISNPS becomes "4682" or the effective PISN=4682. The new VICCN, when the personal charge number is used the second time, is now "1(0)2(7)3(8)4(9) 56789123456". For the four digit PISN of 2468, there are a total of four available PISNPS states through use of a simple clockwise rotation permutation: "2468", "4682", "6824" and "8246". Thus the VICCN for use in Internet commerce is different for each different PISNPS dependent upon which state is prevalent at the time of using the personal charge number on the Internet.

At the request of the first entity, the Money Source could also make available to the first entity a device called Valid Internet Credit Card Arranger (VICCA) which helps the first entity in generating the Valid Internet Credit Card Number (VICCN) for use on the Internet according to the present invention. The VICCA takes as inputs the first entity or user's PIN, PISN and CCN, and then combines this information to generate a Valid Internet Credit Card Number (VICCN), taking into consideration automatically the so-called PISNPS Permutation State. The Permutation State of the PISN is defined as the N possible clockwise permutation allowed when N is the number of numerical (or alphanumerical) digits contained in the PISN. Thus, for example, N=4 if PISN =2468. Then the number of possible permutation state is four as alluded to earlier.

When the first entity's personal charge number is used for the first time, the initial PISN defines the fist Permutation State or PISNPS. The VICCA automatically takes into consideration the PISNPS needed to generate the VICCN, every time the personal charge number is used on the Internet, by performing the necessary clockwise rotation permutation of the PISN after every use of the personal charge number. The VICCA is meant only as a convenience device for the first entity who can also keep track of the Permutation State without use of the VICCA to arrive at the same VICCN every time the personal charge number is used for commerce on the Internet.

Thus, for the first entity to conduct commerce on the Internet, the first entity first sends the order information, the first entity's ID and a VICCN to the merchant through the Internet. The merchant in turn sends the ID and VICCN along with a transaction monetary value via the Internet to the Money Source for verification. Knowing the user ID and the VICCN, the Money Source can quickly verify that the VICCN is valid for the first entity, verify that the transaction monetary value is within the limits of transactions available to the first entity through use of the user account number that was used to generate the VICCN, and then send the merchant a confirmation or verification of the validity of the transaction on the Internet. Thereafter, the merchant could be paid, and the first entity could be billed, in the same fashion that credit card companies currently handle credit card transactions. Moreover, the Money Source could charge the merchant and/or the first entity a portion of the transaction monetary value as a fee for providing such services.

An advantage of the preferred embodiment is that it can easily be adopted for use in existing systems with a minimum of difficulty and without the need for complicated training of users. If the Money Source is a company that already issues credit cards, existing credit card numbers could be used for the personal charge numbers of users of the system. In such a situation, the present invention enables the first entity to conveniently conduct commerce on the Internet without fear of security break on the first entity's personal ID or financial liability because the existing credit card number is not transmitted naked on the Internet. Instead, the existing credit card number is encrypted and converted into a VICCN. Thus, to obtain the credit card number of the first entity from use of the VICCN on the Internet, a pirate would have to decrypt the VICCN. Furthermore, if the VICCN is intercepted and used, it will not be valid unless the permutation variable used to generate the VICCN is valid at the time that a person pirating the VICCN tries to use the VICCN.

In an alternative embodiment, instead of creating a record of information used to generate a VICCN for a first entity with the Money Source, the Money Source could use such information to generate a "record" of valid VICCN for the first entity, depending upon the correct state of the permutation variable. In this embodiment, after a vendor transmits a VICCN and first entity identifier to the Money Source, the Money Source would verify that the VICCN is in fact valid. Once validity is confirmed and the transaction is processed, the VICCN would no longer be valid and a new VICCN would be needed for a valid transaction from the first entity. In its simplest form, the Money Source could simply create a string of personal charge numbers associated with the first entity that are accessed by a rolling scroll mechanism. Further, to the extent that any of the variables used to create the string are subsequently varied, the list could simply be regenerated.

The above discussion of this invention is directed primarily to the preferred embodiments and practices thereof. Further modifications are also possible in alternative embodiments without departing from the inventive concept. Thus, for example, methods other than clockwise rotation could be used to alter the permutation variable. For example, a number could be added to one of the digits of the PIN or the PISN in a sequential fashion or one of digits could be sequentially varied.

Accordingly, it will be readily apparent to those skilled in the art that still further changes and modifications in the actual concepts described herein can readily be made without departing from the spirit and scope of the invention as defined by the following claims.

What is claimed:

1. A method for providing secure transactions between a first entity and at least one additional entity, comprising the steps of:
   (1) assigning a user account number to the first entity;
   (2) generating a record associated with the first entity with a money source repository which includes the user account number of the first entity, a user key, a user insertion key and a first entity identifier;
   (3) generating a personal charge number from the user account number by inserting the user key into the user account number in accordance with an algorithm that uses the user insertion key and a permutation variable;
   (4) transferring the personal charge number and the first entity identifier to a second entity;
   (5) transmitting the personal charge number, the first entity identifier, a transaction monetary value and a second entity identifier from the second entity to the money source;
   (6) verifying that the personal charge number is valid for the first entity;
   (7) providing the second entity with a monetary credit associated with the transaction monetary value; and
   (8) charging the first entity with a charged credit associated with the transaction monetary value.

2. A method as recited in claim 1, wherein the monetary credit is equal to or less than the transaction monetary value.

3. A method as recited in claim 2, wherein the charged credit is equal to or greater than the monetary credit.

4. A method as recited in claim 1, comprising the additional steps of:
   (9) changing the permutation variable from an initial state to a different state; and
   (10) repeating steps (3) through (8).

5. A method as recited in claim 4, wherein the permutation variable is a permutation state of the user insertion key.

6. A method as recited in claim 5, wherein the permutation state of the user insertion key is changed by rotation.

7. A method as recited in claim 4, wherein the personal charge number generated in step (3) is different from the personal charge number that is generated when step (3) is repeated.

8. A method as recited in claim 7, comprising the additional steps of:
   (11) repeating steps (9) and (10).

9. A method as recited in claim 8, wherein the personal charge number generated as part of step (11) is different from the personal charge number that is generated as part of step (10) or as part of step (3) before it is repeated as part of step (10).

10. A method as recited in claim 4, wherein the permutation variable is an additional digit added to the user insertion key.

11. A method as recited in claim 4, wherein the permutation variable is an additional digit added to the user key.

12. A method as recited in claim 1, wherein the personal charge number will not be verified as valid in step (6) unless the permutation variable used to generate the personal charge number is valid at the time verification.

13. A method for providing secure transactions between a first entity and at least one additional entity, comprising the steps of:
   (1) creating a record of a plurality of personal charge numbers for a first entity with a first entity identifier in a money source repository from a user account number of the first entity, a user key and a user insertion key by inserting the user key into the user account number in accordance with an algorithm that uses the user insertion key and a permutation variable which is varied to create each of the plurality of personal charge numbers;
   (2) selecting a first of the plurality of personal charge numbers as being valid within the record to create a valid personal charge number associated with the first entity identifier;
   (3) transferring the valid personal charge number and the first entity identifier to a second entity;
   (4) transmitting the valid personal charge number, the first entity identifier, and a transaction monetary value from the second entity to the money source repository;
   (5) verifying that the valid personal charge number is valid for the first entity;
   (6) changing the first of the plurality of personal charge numbers to an invalid state and creating a new valid personal charge number from one of the remaining plurality of personal charge numbers;
   (7) providing the second entity with a monetary credit associated with the transaction monetary value; and
   (8) charging the first entity with a charged credit associated with the transaction monetary value.

14. A method as recited in claim 13, wherein the monetary credit is equal to or less than the transaction monetary value.

15. A method as recited in claim 13, wherein the charged credit is equal to or greater than the monetary credit.

16. A method as recited in claim 13, comprising the additional steps of:
   (9) repeating steps (3) through (8) until all of the plurality of personal charge numbers have been a valid personal charge number and then repeating the sequential process selection of valid personal charge numbers.

17. A method as recited in claim 13, wherein the permutation variable is a permutation state of the user insertion key.

18. A method as recited in claim 17, wherein the permutation state of the user insertion key is changed by rotation.

* * * * *